March 20, 1962 R. A. HUNT 3,025,623

CARD STRUCTURE

Filed Feb. 13, 1961 3 Sheets-Sheet 1

INVENTOR.
ROBERT A. HUNT

BY Kenwood Ross

ATTORNEY.

INVENTOR.
ROBERT A. HUNT
BY Kenwood Ross
ATTORNEY.

March 20, 1962 R. A. HUNT 3,025,623

CARD STRUCTURE

Filed Feb. 13, 1961 3 Sheets-Sheet 3

INVENTOR.
ROBERT A. HUNT

BY Kenwood Ross

ATTORNEY.

United States Patent Office 3,025,623

Patented Mar. 20, 1962

3,025,623
CARD STRUCTURE

Robert A. Hunt, Wilbraham, Mass., assignor to I. R. Systems, Inc., West Springfield, Mass., a corporation Filed Feb. 13, 1961, Ser. No. 88,900
3 Claims. (Cl. 40—158)

The present invention relates generally to new and useful improvements and structural refinements in a card structure and a method of making same and is directed more particularly to the provision of an apertured film card and an improvement in the means for mounting film upon the card for the filing or storage or other use thereof.

It will be helpful to an understanding of my invention first to consider briefly some of the essential points and more important features and aspects thereof, so that same may be kept in mind during a subsequent reading of the detailed description of the practical embodiments of my improvements and illustrations thereof in the hereunto annexed drawings.

Accordingly, it will first be noted that the invention relates to a means for and/or a method of mounting a strip or a section of film, such as micro-film, in an aperture provided in a card.

Stated broadly, the invention relates to a joint construction and to a method of bonding elements together to form a unit construction and to the article so constructed.

It has been known heretofore to mount record sheets or inserts, such as micro-films, photographs, or the like, in apertures in statistical or record or catalog cards, all to the end that same may be conveniently filed, classified, and sorted or indexed as to subject matter or otherwise for subsequent projecting and viewing.

In the known prior art, it has been common to secure adhesively the film or the like in a transparent or opaque adhesive coated sheet, which sheet in turn is secured to a surface of the card and extensible across a complemental aperture therein. Usually, such cover sheet has to be peeled off before use so as to constitute a nuisance. The opaque sheet may be provided with an opening which is smaller in dimensions than the card aperture so as to expose a portion of the film and permit light to be transmitted therethrough. Furthermore, any tacky adhesive has a tendency to flow during storage so that it may seep out and cause adjacent cards to stick togeher.

It has also been proposed to utilize a card having an aperture therein and an embossed recess in one surface thereof adjacent said aperture, in which recess, the film may be placed and secured so that the outer surface of said film is even with or slightly below the plane of the card surface.

It has been another practice to mount a film within the aperture of a card by the use of an adhesive substance bonding the card and film together, or by the application of heat and pressure to the edges of the film so as to cause the film to adhere to the adjacent edges of the card aperture.

These methods have certain common and obvious objections. Among others is the fact that, by the application of heat and pressure to the film, the card tends to curl, while the film loses its original thickness and shape. Too, the film image may be distorted due to a displacement of the emulsion resulting in spoilage of the image. Further, the bond created between card and film by any adhesion technique has the disadvantage that it does not have the strength required to withstand repeated handling so that the card and film soon become separated. Still further, when a tacky adhesive is employed, a cover sheet is required to protect the adhesive during shipment and storage of the card and must be stripped from the card before use, which procedure is time-consuming and bothersome since difficulty is oftentimes encountered in separating the sheet from the adhesive. It is also known that any tacky adhesive has the inherent tendency to flow during storage. Thus, the adhesive may seep between adjacent stored cards, whereupon the cards are caused to adhere to each other, thereby precluding the rapid sorting or filing thereof. Still further, such prior art structures have the disadvantages that they are expensive and difficult to manufacture.

It is a principal object of the present invention to provide means for holding film in the aperture of a card by the use of novel reshapeable interlocking links, sometimes referred to as "swage-locks," and fabricated from a deformable plastic or the like, which do not bond, either to the film or to the card, all so as to create a truly mechanical joint, the reshapeable interlocking links hereof neither being of an adhesive material in themselves nor containing an adhesive substance to chemically interact with film and/or card.

Another salient object hereof is to provide a plurality of such reshapeable interlocking links, which are readily deformable upon the application of heat and pressure or heat alone, or of pressure alone, so as to interconnect a film insert disposed in an aperture in a film card in such manner that movement of film relative to card or movement of card relative to film is constrained.

It is still another object to provide a simple construction which may be easily and inexpensively produced and wherein the film or other record sheet is secured within an aperture in a card without the aid of an adhesive coated sheet on the card or without the aid of any adhesive whatever.

It is a further object to provide a record or other card structure having a film section or other record bearing strip mounted in an aperture therein in a novel manner, whereby said card is satisfactory with respect to machine handling and may be employed in connection with known and existing record card handling machines, the assemblage being readily susceptible to sorting or filing.

Without intending to place undue limitations upon the scope of the invention beyond what may be required by the state of the prior art, the particular embodiment may be briefly described as embracing the concept of notching the edges of a film and the corresponding adjacent edges of an aperture provided in a card, debossing the card on both planar surfaces thereof adjacent these notches or adjacent said aperture, inserting a plurality of reshapeable interlocking links into the aligned pairs of notches of the film and card, and deforming these interlocking links, thereby causing the upper and lower planar surfaces thereof to spread and embrace the upper and lower planar surfaces of said card and said film, thereby effectuating the union of film and card by a mechanical action as distinguished from a chemical or adhesive action.

It is another object to provide a novel method of mounting a film section or other record bearing strip in a record or card, whereby the card structure is materially simplified and may be made in quantities and supplied to users thereof in a prepared form ready for mounting of the film sections therein in a relatively simple manner.

Another object hereof is to provide for use in mounting a transparency, such as microfilm, a record or other card structure having a series of openings therein arranged in a closed pattern conforming to the peripheral contour of the film, each of said openings being adapted to receive a half portion of a generally "bow-tie" shaped reshapeable interlocking link.

Another of the primary objectives is to provide a method of mounting a film upon a card wherein the possibility of damage to the film is obviated, wherein a flat card having a symmetrical construction is produced, and wherein a strong connection between card and film in the form of a mechanical link which will withstand repeated handling is attained.

It will be understood that in producing a flat card having a symmetrical construction, the tendency of the card to warp is virtually overcome.

As a further refinement, heat and/or pressure are applied to the reshapeable interlocking links only, thereby producing a non-stressed card construction wherein the film will not have the tendency to buckle or bulge.

If desired, a metallic plate may be placed upon the film, during the application of heat to the interlocking links, which plate will quickly absorb any unwanted heat which otherwise would be transmitted from the links to the film, thereby precluding the possibility of film distortion.

It will be understood that should plastic interlocking links be employed, a minimum amount of heat is required, since the plastic material possesses the characteristic of ready deformability with minimal heat application, wherefore the material need not be melted but need only be softened.

Other of the chief objects and purposes hereof are to provide advantageous structural features in a device of the class to which reference has been made so as to offer a film card having the following inherent meritorious characteristics; first, engineeringwise, a uniqueness in design wherefor the components are coordinated for facile assembly and, when once assembled, are positively and securely retained so as to be not readily separable from each other, accidentally or otherwise; second, a high degree of efficiency and dependability in its use; third, the provision of a construction which is well adapted to withstand the usage to which such a film card is ordinarily subjected, and fourth, the provision of such other improvements in and relating to film cards of the type above referred to as are hereinafter described and claimed.

These foregoing objects and other incidental ends and advantages will in part be obvious and apparent and will in part be more fully pointed out as the nature of the invention is better understood in the progress of the disclosure below. To the end of attaining these objects and advantages and others hereinafter reasonably appearing, it will be explained that the invention consists substantially in the combination, construction, configuration, location and function of parts, as herein described in detail though it will be apparent that the physical embodiments delineated, albeit the preferred exemplifications, are only indicative of but several of the multiplicity of ways in and purposes for which the principles of the invention may be employed. Same are submitted as best known embodiments of the invention in accordance with the patent statutes and are given with a view to illustrating and explaining the precise nature of the principles of the invention, in order that others skilled in the art to which the invention pertains may be enabled to adapt and modify them in other variations and modifications, each as may be best adapted to the conditions of any particular use.

The objects of the invention are susceptible of attainment by use of constructions different in certain repects from that disclosed, such as minor changes and variations in dimensions, shape, form, proportion, integration, and/or cooperation of material, all without departing from the underlying principles, salient features, scope and spirit hereof.

The characteristic features which I consider to be novel with my invention, as to its construction and organization and as to its methods of manufacture and operation, will be better understood from a consideration of the following detailed description, forming a part of this specification, when read in conjunction with the illustrations in the accompanying drawings, wherein like characters of reference are employed to designate like or corresponding parts throughout the several views and in which.

In the following description and in the appended claims, various components and details thereof will be identified by specific names for purposes of convenience. Although specific terms and expressions are employed for purposes of identifying various components, they are used in a generic and descriptive sense only. They are not intended to exclude any reasonable equivalents of the features shown and described or portions thereof.

With continued reference now to the drawings, which illustrate typical and preferred embodiments of the invention for the purpose of disclosure and form a part of this specification, I have shown an elongated, generally rectangular record card 2, formed from cardboard, heavy ply paper or the like, and having an aperture 4 of generally rectangular shape provided therein.

It will be understood that card 2 envisioned herein is of the type embodied for use as a statistical or tabulating card whereby transparencies, such as micro-films, affixed to such cards may be machine classified as to subject matter in accordance with a particular code by perforations in said cards as well understood in the tabulating machine art, and automatically sorted under the control of said perforations in known and existing tab record card sorting machines. The card may also be of the marginally punched cards of the McBee type and commercially known as "Keysort" cards, as well as in other forms of record and catalogue cards, and ordinary cards for various purposes.

The invention further comprehends the mounting of photographs, as well as other opaque, translucent and transparent sheets.

A plurality of generally triangulate openings in the form of notches 6 are provided through card 2 peripherally of and adjacent aperture 4, with each of said notches having a neck 8 of reduced size which opens into and communicates with aperture 4.

Figure 1:
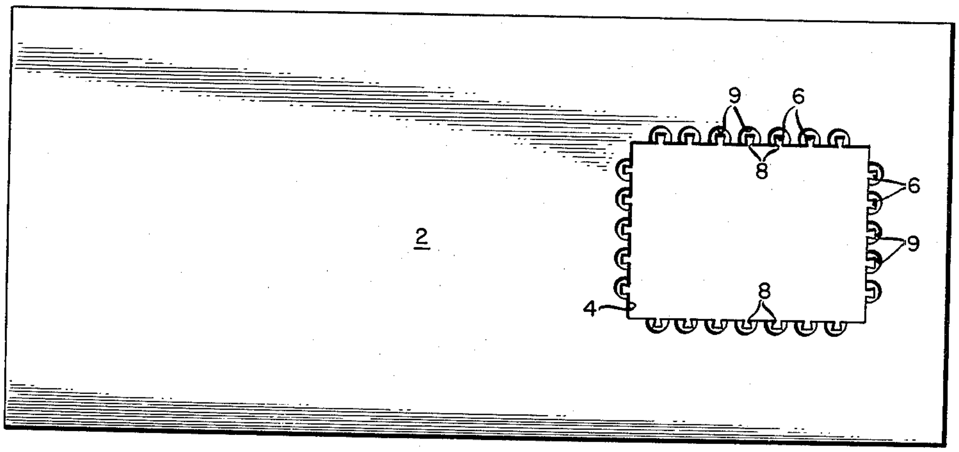
FIG. 1 is a top plan view of a film card embodying certain features of the invention.
Figure 2:
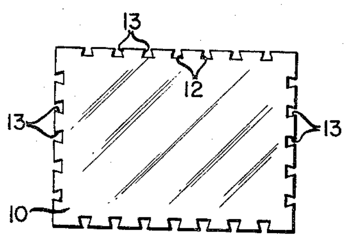
FIG. 2 is a top plan view of a film strip notched in accordance with the invention.

The notches of the plurality thereof are thus arranged in a pattern such as a rectangle, as shown in FIG. 1, and may be formed in said card as by a punching operation preferentially, when and as aperture 4 is punched.

Card 2 is debossed adjacent each of the notches 6 to form depressions 9 in the upper and lower planar surfaces of said card, which depressions may be of any configuration, such as circular, square, rectangular, triangular or the like, sufficient to provide a deforming area adjacent the notches and adaptable to receive portions of interlocking links 14 subsequently to be described.

Alternatively, it will be noted, that if desired, card 2 may be debossed completely around aperture 4, which procedure will permit of the more rapid and less expensive manufacture of the cards.

As will hereinafter more fully appear, by the provision of depressions 9 adjacent notches 6, card 2 will present a smooth, unbroken surface after a film has been mounted therein, a highly desirable feature in the filing and/or sorting of said cards.

It will be understood that aperture 4 may be of any desired contour, shape or size, depending upon the contour, shape or size of the film, photograph or other material which it is desired to be inserted thereinto.

A record bearing sheet or film strip or insert 10 of an overall dimension slightly less than that of aperture 4 is provided, said insert having a plurality of outwardly-facing triangulate notches 12 disposed adjacent each of its peripheral edges, which notches are provided with necks 13 of a reduced size opening outward of the insert.

The reduced necks 8 of notches 6 in card 2 stand in face-to-face relationship with, and complement, the reduced necks 13 of notches 12 in insert 10.

It will, of course, be apparent that notches 6 and 12 may be of any desired configuration, their contours not being limited to the triangulate shape herein described as, for example, annular notches may be provided to function with equal effectiveness.

Figure 5:
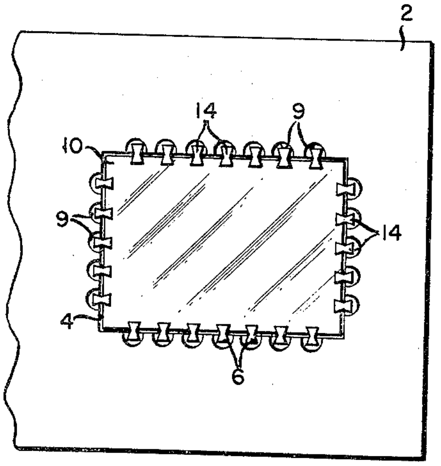
FIG. 5 is a fragmentary plan view of the card of FIG. 1 having a film strip mounted therein, and illustrating the disposition of the interlocking links in the notches of said card and film, preliminary to the reshaping or deforming of said links.

Referring to FIG. 5, it will be observed that when insert 10 is placed within aperture 4, the edges of the insert are spaced slightly inwardly from the adjacent edges of the aperture, and notches 12 of the insert are alignable with notches 6 of the card.

A reshapeable or readily deformable interlocking link or swage-lock 14 is provided and may be fabricated from a resinous material such as plastic, or may be formed from a malleable metal.

Figure 3:
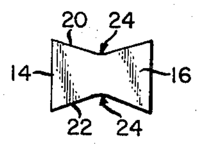
FIGS. 3 and 4 are top plan and side elevational views respectively of the reshapeable interlocking link or swagelock of the invention.
Figure 4:
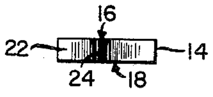

As best seen in FIG. 3, interlocking link 14 is formed with a somewhat bow tie shape which generally conforms to the contours assumed by the adjacent notches 6 and 12 in the card and film strip respectively, when said film is placed in the aperture of the card.

It will be understood that interlocking link 14 may be formed with shapes or contours other than that herein described, all without departing from the spirit and scope hereof.

Interlocking link 14 will be of appropriate size and configuration to be receivable in a loose fitting manner in the complemental notches 6 and 12 of the card and film strip respectively.

Side walls 20 and 22 of interlocking link 14 will be seen to converge inwardly from the forward and rearward edges of the link to form a generally V-shaped notch 24 disposed centrally of each of said side walls, wherefore the interlocking link may be described as having two identical halves, each of which is complemental to the notches 6 and 12.

In the mounting process, film strip 10 is disposed within aperture 4 of the card. As aforesaid, the horizontal and vertical edges of the film will be spaced slightly inwardly from the adjacent sides formed by aperture 4.

An interlocking link 14 is then placed within each of the recesses formed by notches 6 and 12 so as to extend between and interconnect film and card.

Figure 6:
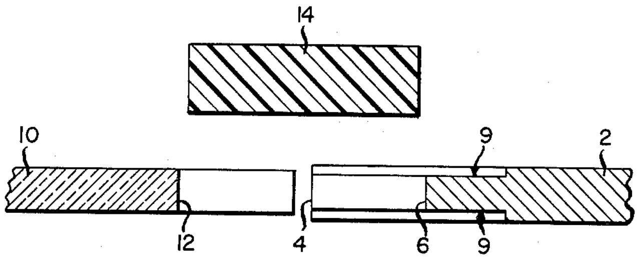
FIG. 6 is an enlarged, exploded, sectional view showing the relationship of film, card and interlocking link preliminary to insertion of the interlocking link into the film and card notches.
Figure 7:
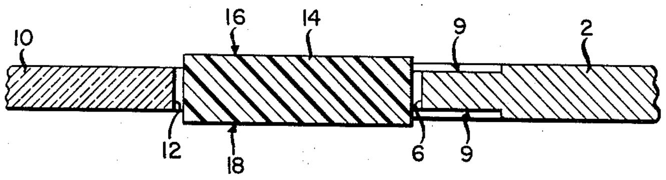
FIG. 7 is an enlarged, sectional veiw showing the interlocking link in place in the notches of the film and card preliminary to the reshaping or deforming of said link.

Referring to FIGS. 6 and 7, it will be seen that the overall length of the interlocking links is preferentially slightly less than the distance from the base of the accommodating notch 6 to the base of the accommodating notch 12.

It will also be observed that the upper and lower planar surfaces 16 and 18 respectively of link 14 are disposed in planes above and below the planes of the upper and lower planar surfaces respectively of the card.

In the final stage of the mounting process, the interlocking links of the plurality thereof are reshaped or deformed by any suitable swaging means. Same not forming a part of this invention, detailed discussion of such means will not be made.

As the interlocking link is deformed, it is caused to spread so as to overlie the peripheral edges of the accommodating notches 6 and 12, and to be disposed in depressions 9 adjacent notches 6 in card 2.

Figure 8:
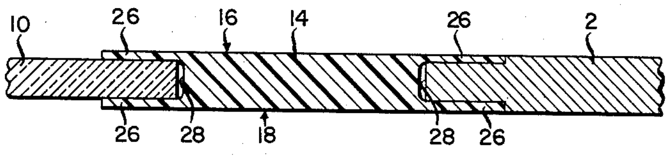
FIG. 8 is an enlarged, sectional view showing the holding action of the interlocking link with the card and film subsequent to the deforming or reshaping of said link.

As best seen in FIG. 8, lips 26 extend laterally outwardly from the upper and lower planar surfaces of the interlocking links adjacent the peripheral edges thereof, to intimately embrace the upper and lower planar surfaces of the film and to extend into the depressions 9 in the card adjacent the notches 6 in bonded relation. By the provision of depressions 9, both planar surfaces of the card are flush or flat and completely lacking projections caused by the deforming of the interlocking links.

It is to be emphasized that lips 26, while tightly embracing card and film, do not actually adhere thereto.

Again referring to FIG. 8, it will be seen that a recess or void 28 remains between the end walls of the interlocking link and the bases of the notches 6 and 10. Thus, a true mechanical bond is created between film and card, with the interlocking links holding the two in position and constraining their relative movement not by adhesion, but by mechanical force alone.

Figure 9:
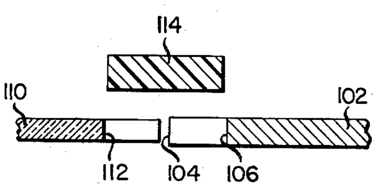
FIGS. 9–11 are enlarged, sectional views similar to FIGS. 6–8 respectively showing a modified form of the invention.
Figure 10:
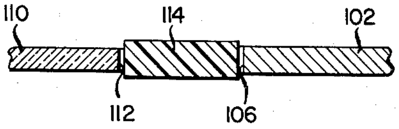
Figure 11:
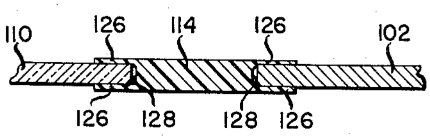

In the modified embodiment of the invention illustrated in FIGS. 9–11, a record card 102, film strip 110 and interlocking link 114 are shown in the positions assumed before and after the mounting operation.

It will be observed that a notch 106 disposed adjacent an aperture 104 provided in card 102 complements a notch 112 provided in film 110.

It will be noted that the overall length of the interlocking link is preferentially slightly less than the distance from the base of its accommodating notch 106 to the base of its accommodating notch 112.

It will further be observed that the upper and lower planar surfaces of the interlocking link are disposed in planes above and below that of the upper and lower planar surfaces respectively of the film and/or the card.

In the final stage of the mounting process, the interlocking link is deformed or reshaped by any suitable means and as it is deformed or reshaped, it is caused to spread so as to overlie the peripheral edges of each of the notches 106 and 112.

As best shown in FIG. 11, lips 126 extend laterally outwardly from the upper and lower planar surfaces of the link adjacent the peripheral edges thereof and embrace the upper and lower planar surfaces of the film and card respectively. It is to be emphasized that the lips 126, while tightly embracing the card and film, do not actually adhere thereto.

Again referring to FIG. 11, it will be seen that a recess or void 128 remains between the bases of the link and the end walls of notches 106 and 110. Thus, a true mechanical connection is created between film and card, with the interlocking link holding the two in position, not by adhesion, but by mechanical force alone.

In both the preferred embodiment of the invention as shown in FIGS. 1–8, and the modification as illustrated in FIGS. 9–11, for convenience in handling and filing of the cards and so as to insure effective handling of said cards, in record card punching, tabulating and sorting machines, as well as in other card handling machines, the thickness of the film or insert should not exceed the thickness of the card and said film or insert should not project beyond opposite plane surfaces of said card.

In the illustrated embodiments, the card is of a thickness greater than the thickness of the film or insert, said card, like the tabulating cards in actual commercial use, being approximately .0075" thick, and said film being approximately .005" thick.

When the thickness of the film or other insert is less than the thickness of the card, said film or insert may be set inwardly from both faces of the card, as in the illustrated embodiments, thereby protecting both surfaces of the film or insert against injurious abrasive action and, in the preferred embodiment; insuring that both faces of the card are flush or flat and completely lacking of any projections.

From the foregoing, it will be obvious that I have provided a truly novel structure and method for employing same.

It is believed that the gist of the invention will be clearly understood from the foregoing disclosure, and accordingly, further analysis thereof at this point is considered unnecessary, as I have, in accordance with the provisions of the patent statutes, described the construction and principle of operation of my invention to the end that others can, by applying current knowledge, readily adapt it for various applications without omitting features which, from the standpoint of prior art, fairly constitute essential characteristics of its generic and/or specific aspects.

The substitution of equivalents and other changes, modifications and alterations as circumstances may suggest or render expedient, are reasonably contemplated, the invention being susceptible of such without departing from its real spirit or underlying principles.

The protection which is sought for this invention is covered by the language of the above specification and the spirit represented thereby.

The claims are desired to include, within the scope thereof, all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. A record card for mounting a film comprising, a card having an aperture therein of a predetermined size and shape and having a plurality of notches disposed about the peripheral edges of said aperture in a preselected pattern and each opening into the aperture, a film insert of a size and shape for positioning wholly within the aperture of said card and being provided at its peripheral edges with a plurality of peripheral notches, the notches of said card each being alignable with one of the notches of said film insert, and a plurality of interlocking means each disposed in one of the notches of said card and the complemental notch of said film insert whereby said card and said insert may be interlocked.

2. In the record card as set forth in claim 1 wherein, said interlocking means comprises an interlocking link of substantially the same shape and size as the notches of a pair formed by the complementary notches in said insert and card.

3. A record card for mounting film and the like comprising, a card having an aperture of a certain size therein, an insert positioned wholly within said aperture and being of a size less than said certain size, a plurality of notches disposed about the peripheral edges of said aperture and communicating therewith, a plurality of notches provided adjacent the peripheral edges of said insert and communicating therewith, each notch in said card being alignable with one of the notches of said insert, and a plurality of reshapeable interlocking links disposed in the notches of said card and said insert, which interlocking links of said plurality thereof interlock adjacent edges of said card and film by mechanical engagement within one of the notches of said card and the aligned notch of said insert.

References Cited in the file of this patent

UNITED STATES PATENTS

| | | |
|---|---|---|
| 2,612,711 | Baker | Oct. 7, 1952 |
| 2,633,654 | Roetger | Apr. 7, 1953 |
| 2,690,021 | Langan | Sept. 28, 1954 |